United States Patent [19]

Eom et al.

[11] Patent Number: 5,344,608

[45] Date of Patent: Sep. 6, 1994

[54] ALLOYED METAL FOR HORSESHOES OF RACE HORSE

[75] Inventors: Young ho Eom; Tae un Nam, both of Seoul, Rep. of Korea

[73] Assignee: Korea Racing Association, Kwachun-City, Rep. of Korea

[21] Appl. No.: 81,060

[22] Filed: Jun. 25, 1993

[51] Int. Cl.$^5$ .......................... C22C 21/06; A01L 1/00
[52] U.S. Cl. ..................... 420/532; 148/439; 168/4; 420/534; 420/541; 420/546
[58] Field of Search ............... 420/532, 534, 541, 546; 148/439; 168/4

[56] References Cited

U.S. PATENT DOCUMENTS

| | | | |
|---|---|---|---|
| 4,017,337 | 4/1977 | Winter et al. | 420/534 |
| 4,645,543 | 2/1987 | Watanabe et al. | 148/439 |
| 4,655,293 | 4/1987 | Criner, et al. | 168/4 |

*Primary Examiner*—Melvyn J. Andrews
*Assistant Examiner*—Robert R. Koehler
*Attorney, Agent, or Firm*—Nikaido, Marmelstein, Murray & Oram

[57] ABSTRACT

The present invention relates to an alloy metal horseshoe for a race horse. The objective of the invention is to provide an alloy metal horseshoe for a race horse, which is light in weight, of great expansibility and hardness, with high abrasion resistance, shock absorption and ductility, capable of being slightly modified to suit the form of the horsehoof at the time of fitting, and that can rationalize the manufacturing process with heat treatment omitted. The horseshoe used a metal alloy made by mixing and dissolving Si:0.05–0.10%, Fe:0.05–0.10%(WT), Cu:0.10–0.20%(WT), Mn:0.10–0.20%(WT), Mg:3.00–5.00%(WT), Cr:0.05–0.15%, Zn:0.05–0.10%, and Al:96.6–94.15%(WT) in an electric furnace.

1 Claim, No Drawings

ALLOYED METAL FOR HORSESHOES OF RACE HORSE

DETAILED DESCRIPTION OF INVENTION

The present invention relates to an alloyed metal designed to be used for horseshoes of a race horse. The objective of this invention is to provide a light alloyed metal excellent in abrasion resistance, shock absorption, and in ductility, for the horseshoes of race horses.

The horseshoe should primarily be light with ductility so that its shape may be changed a little to correctly fit on the horsehoof. It should also have the anti-abrasiveness to long endure frictions with the surface of the track and to reduce the shock that occurs at the time of stepping on the track surface.

Since the conventional horseshoe was heavy as having been made mainly of mild steel, and poor in shock absorption because of its insufficient ductility, the shoe has recently been made of alloyed alumnium buried with elastic shock-absorbing materials such as rubber and plastics but found difficult to protect the hoof and kneejoint of the horse because of defects from its complex and easily breakable structure.

Since the race horse runs at a speed of 60 Km/Hr during the race undergoing a shock of 1 ton in a moment (0.017 second) the horseshoe must be excellent in abrasion resistance and shock absorption and ductile enough to change its shape a little so as to suit the diverse sizes and forms of the hooves at the Lime of fitting on the hoof.

To improve and solve the said problems of the conventional mild steel or almunium horseshoe, the present invention developed an alloyed metal to be used as a horseshoe of the race horse. This alloyed metal is only about one-third of the weight; of the mild steel horseshoe and excellent in abrasion resistance, shock absorption and ductility. To rationalize the manufacturing process of the invention, 5XXXAl of Al-Mg series of non-heat treatment was adopted, which did not require precipitation hardening with soluting and aging treatments. A detailed description of the invention follows.

The present invention is an alloyed metal for use as horseshoes of the race horse, that was made by mixing Si:0.5%–0.10%(WT), Fe:0.05–0.10(WT), Cu:0.10–0.20%(WT), Mn:0.10–0.20%(WT), Mg:3.00–5.00%(WT), Cr:0.05–0.15(WT), Zn:0.05–0.10%(WT), and Al:96.6–94.15%(WT).

The effects of action of the present invention are described below.

The horseshoe of the race horse should primarily be capable of resisting frictions with the track surface, absorbing the momentary shock of one ton occurring from the speed of 60 Km/Hr during a race, and resisting abrasion therefrom. In view of this, the inventor, therefore, inventor adopted the alloyed metal as light as one-third of the conventional mild steel shoe, to protect the hooves and knee joints of the race horse and to enhance the racing speed and to enable the shoe securely and perfectly fit on the hoof by taking advantage of its ductility to modify its shape a little.

Meanwhile, to rationalize the manufacturing process of the horseshoe, the 5XXXAl of Al-Mg alloy series (American Alloy series) was adopted which does not required precipitation hardening under solut-and aging treatments. The biggest demerit of this 5XXX series is excessive Mg which causes too much stress corrosion cracking due to recrystallized annealing, and, thereby, the internal stress is removed to cause an excessive ductility and contraction, which again results in a low hardness and strength. In order to hold the extreme abrasion resulted therefrom in check, an appropriately safe strength has been given by adjusting the content of Mg to be 3.00–5.00%(WT) and adding 0.01–0.10%(WT) of Zn thereto so that the shape of the shoe may be modified a little at the time of filling. Furthermore, to increase anti-corrosive effects of impure materials, Fe is minimized to be 0.03–0.08%(WT) and Cu and Mn were reduced respectively to be 0.10–0.20%(WT).

Further, shown in the table be low are the figures of chemical components and comparative values of expansibility and ductility of the present invention which is of non-precipitation hardening type, Al-Cu alloy and Al-Zn series alloy which are of precipitation hardening type, and Al-Mg which is another of non-precipitation hardening type.

Comparative Table of Expansibility and Ductility of the Present Invention and Each Alloy Series

| Sample | | Component | | | | | | | Expansibility & Strength (Kg/mm$^2$) | Ductility (%) |
| --- | --- | --- | --- | --- | --- | --- | --- | --- | --- | --- |
| | | Si | Fe | Cu | Mn | Mg | Cr | Zn | Al | | |
| 1 | The Invention | 0.08 | 0.08 | 0.11 | 0.13 | 5.00 | 0.12 | 0.05 | 94.89 | 30 | 42.5 |
| 2 | Al—Cu Series | 0.67 | 0.14 | 3.9 | 0.79 | 0.43 | 0.01 | 0.48 | 93.58 | 39 | 17 |
| 3 | Al—Cu Series | 0.05 | 0.13 | 4.00 | 0.50 | 1.30 | — | 0.05 | 93.89 | 44 | 14 |
| 4 | Al—Zn Series | 0.06 | 0.12 | 1.46 | 0.2 | 3.14 | 0.32 | 6.02 | 88.86 | 56 | 10 |
| 5 | Al—Mg—Zn Series | 0.04 | 0.13 | 0.03 | | 2.18 | 0.28 | 0.06 | 97.28 | 54 | 13 |
| 6 | Al—Mg Series | 0.03 | 0.09 | 1.19 | | 2.48 | 0.26 | 1.93 | 94.02 | 18 | 36 |
| 7 | Al—Mg Series | 0.06 | 0.23 | 0.01 | | 1.45 | 0.17 | 0.01 | 98.09 | 15 | 33 |

As shown in this table, it can be known that the present invention is inferior in expansibility and strength to the Al-Cu series and Al-Zn series but far superior to the other Al-Mg series while it has been proved that its ductility is much greater than the other alloy series with excellent abrasion resistance so that it gives room for modifying its shape as to suit the form of the hoof during fitting. Al-Cu series of 2 and 3, Al-Zn series of 4 and Al-Mg-Zn series were kept for 20 minutes at 480°C. and for 30 minutes at 500° C. Then, they were placed one hour for soluting treatment at 500° C. and underwent aging treatment for 20 hours at 160°. The other Al-Mg series of 6 and 7, after going through soluting treatment for two hours at 350° C., underwent annealing heat treatment. However, the sample of this invention of Al-Mg series of 1 immediately underwent the annealing heat treatment without going through soluting treatment.

The horseshoe thus manufactured for the race horse with the said structure of alloyed metal is capable of reducing the area of contact with the track surface by the sloped height of its internal and external sides, minimizing the shock of contacting the track surface by evenly distributing the force, and, thereby increasing the durability of the horseshoe.

As stated above, this alloyed metal of non precipitation hardening Al-Mg series, to be used as the horseshoe of the racehorse, is greater in ductility and lighter in weight than the existing mild steel, Al-Zn series alloy or Al-Cu and Al-Mg of precipitation hardening type. It is also excellent in abrasion resistance and shock absorption with abundant ductility. Therefore, the shoe is easily filled on the hoof and a very useful invention that can rationalize the manufacturing process.

EXAMPLE OF APPLICATION

The desired alloyed metal to be used for the horseshoe of the race horse is obtained by dissolving and mixing the pure almunium 96.39 (WT) made by ordinary method under Bayer process with Si:0.08%(WT), Fe:0.08%(WT), Cu:0.15%(WT), Mn:0.13%(WT), Mg:3.00%(WT), Cr:0.12%(WT) and Zn:0.05%(WT) in an electric furnace.

What is claimed:

1. A horseshoe comprising an alloy manufactured by dissolving and mixing Si:0.05–0.10%(WT), Fe:0.05–0.10%(WT), Cu:0.10–0.20%(WT), Mn:0.10–0.20%(WT), Mg:3.00–5.00%, Cr:0.05–0.15%(WT), Zn:0.05–0.10%(WT), and Al:96.6–94.15%(WT) in an electric furnace, wherein said horseshoe does not require solution treatment and annealing heat treatment.

* * * * *